(12) United States Patent
Abdel-Mottaleb et al.

(10) Patent No.: US 6,253,201 B1
(45) Date of Patent: Jun. 26, 2001

(54) SCALABLE SOLUTION FOR IMAGE RETRIEVAL

(75) Inventors: Mohamed Abdel-Mottaleb; Max Wu, both of Ossining, NY (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/102,949

(22) Filed: Jun. 23, 1998

(51) Int. Cl.[7] .................................................. G06F 17/30
(52) U.S. Cl. ........................................... 707/4; 707/5
(58) Field of Search ........................... 707/3, 5, 6, 102, 707/104, 4

(56) References Cited

U.S. PATENT DOCUMENTS

| | | | |
|---|---|---|---|
| 5,644,765 | * 7/1997 | Shimura et al. | 707/104 |
| 5,802,361 | * 9/1998 | Wang et al. | 707/3 |
| 5,819,288 | * 10/1998 | De Bonet | 707/104 |
| 5,852,823 | * 12/1998 | De Bonet | 707/6 |
| 5,987,456 | * 11/1999 | Ravela et al. | 707/5 |

OTHER PUBLICATIONS

Tagare, Increase Retrieval efficiency by Index Tree Adaption, IEEECatalog No. 97TB100175, pp. 28–35, Jun. 1997.*
Ravela et al., Retrieving Images by Similarity of Visual Appearance, IEEE, pp. 67–74, Jun. 1997.*
Curtis et al., A Comprehensive Image Similarity Retrieval System that Utilizes Multiple Feature Vectors in High Dimensional, IEEE, pp. 180–184 vol. 1, Sep. 1997.*
Bae et al, Image Retrieval Using Texture Based on DCT, IEEE, pp. 1065–1068, vol. 2, Sep. 1997.*
Lin et al. A Modular and Flexible Architecture for Real–Time Image Template matching, IEEE, vol. 41, Issue 6, pp. 457–461, Jun. 1994.*
Schweitzer, Indexing Images by Trees of Visual Content, IEEE, pp. 582–587, Jan. 1998.*
Martinez et al., Image Net: A Global Distributed database for Color Image Storage and Retrieval in Medical Imaging Systems, IEEE, pp. 710–719, Jun. 1992.*
Picard et al., Finding Similar Patterns in Large Image Databases, IEEE vol. 5, pp. 161–164, Apr. 1993.*

* cited by examiner

Primary Examiner—Thomas Black
Assistant Examiner—Frantz Coby

(57) ABSTRACT

The invention is a method and apparatus for determining similarity between images based upon a count of the number of similar characterizations of the images. To provide for efficiency in the comparison process, indexed lists of image identifiers are maintained, and the count of similar characterizations of an image is determined by the count of occurrences of the image's identifier in selected lists. The selected lists are determined by a characterization of a target image from which similar images are to be identified. The indexing and retrieval techniques presented herein are suitable for a variety of image characterization techniques, such as characterizations based upon the color content or edge content of partitions of an image. Multiple indexes can be associated with one or more characteristic measures of each partition, allowing for image retrieval based on one or more characteristics of the target image.

20 Claims, 5 Drawing Sheets

SCALABLE SOLUTION FOR IMAGE RETRIEVAL

FIELD OF THE INVENTION

This invention relates in general to the field of computers, and in particular to image retrieval from large image databases, such as photographic archives, digital libraries, catalogs, and videos.

BACKGROUND OF THE INVENTION

Various techniques are commonly employed for retrieving images stored in a database. The most conventional technique for storing and retrieving images which match a desired characteristic is to associate key words with each image, such as "portrait", "seascape", "mountain", "presidents", etc. Having associated such key words to the images, a user provides one or more search words to the search or retrieval system, and the system presents one or more images in dependence upon the degree of correspondence between the search words and stored key words. Conventional Internet search engines are examples of such text based retrieval means.

Text based image retrieval, however, requires the categorizing of each picture by keywords, which can be a burdensome process if applied to hundreds or thousands of images; also, the individual choice of keywords limits the effectiveness of the search to the degree of correspondence between the words the categorizer used to describe the stored images, and the words the searcher uses to describe the desired image.

Graphics based retrieval is a more intuitive approach to image retrieval. Conventional graphic based retrieval systems employ various forms of color or pattern matching. A graphics based system, however, can be computationally intensive. Computer images are typically stored as an array of thousands of pixels, and the color of each of the thousands of pixels is encoded as a multi-byte red-green-blue (RGB) value. The comparison of a target image to a collection of reference images based on these thousands of color values is computationally impractical, and a pixel-by-pixel comparison may not provide a measure of similarity that correlates to the human visual system. Practical graphics based systems, therefore, characterize an image based on a descriptive characteristic of the image, and the comparisons among images are based on the descriptive characteristic. The descriptive characteristic of images include, for example, the colors contained within the image, the edges contained within the image, the arrangement of the colors, the orientation of the edges, etc.

A single characterization of an image, however, may be too coarse of an abstraction to distinguish among images. A singular characterization of a seascape may result in a histogram of color such as: 40% blue, 20% brown, and 40% blue-green. A more descriptive characteristic would include the characterization of the blue color being primarily at the top of the image (the sky), the brown in the middle (the beach), and the blue-green at the bottom of the image (the water). In this manner, images that have the same color proportions, but have the blue color located at the lower-left of the image would be characterized differently from a seascape. Conventional graphics based retrieval systems, therefore, also include a partitioning of the image into an array of partitions, each partition occupying a known location in the image. Comparisons among images are based on a comparison of each corresponding partition in the images. Typically, images are partitioned into dozens or hundreds of partitions, and each partition is characterized by a multidimensional descriptive characteristic, such as a histogram of colors or edges. Comparing one image to another, therefore, requires the comparison of dozens or hundreds of multidimensional characteristics of the images. Comparing a target image to thousands of images in a large reference image database can be computationally infeasible for a real-time image retrieval process.

Therefore, a need exists for a method and apparatus that minimizes the processing time required to compare a target image to a plurality of reference images. Because of the increasing availability of image data, via for example, the Internet, a need also exists for a method and apparatus for image retrieval from a distributed database that allows for the incremental addition of images to the database. A need also exists for a method and apparatus for image retrieval that does not exhibit progressive performance degradation as the size of the database increases.

DETAILED DESCRIPTION OF THE PREFERRED EMBODIMENT

In general, the invention is a method and apparatus for determining similarity between images based upon a count of the number of corresponding partitions in each image having similar characteristics. To provide for efficiency in the comparison process, indexed lists of image identifiers are maintained, and the count of similar characterizations of an image is determined by the count of occurrences of the image's identifier in selected lists. The selected lists are determined by a characterization of a target image from which similar images are to be identified. The indexing and retrieval techniques presented herein are suitable for a variety of image characterization techniques, such as characterizations based upon the color content or edge content of partitions of an image.

Figure 1:
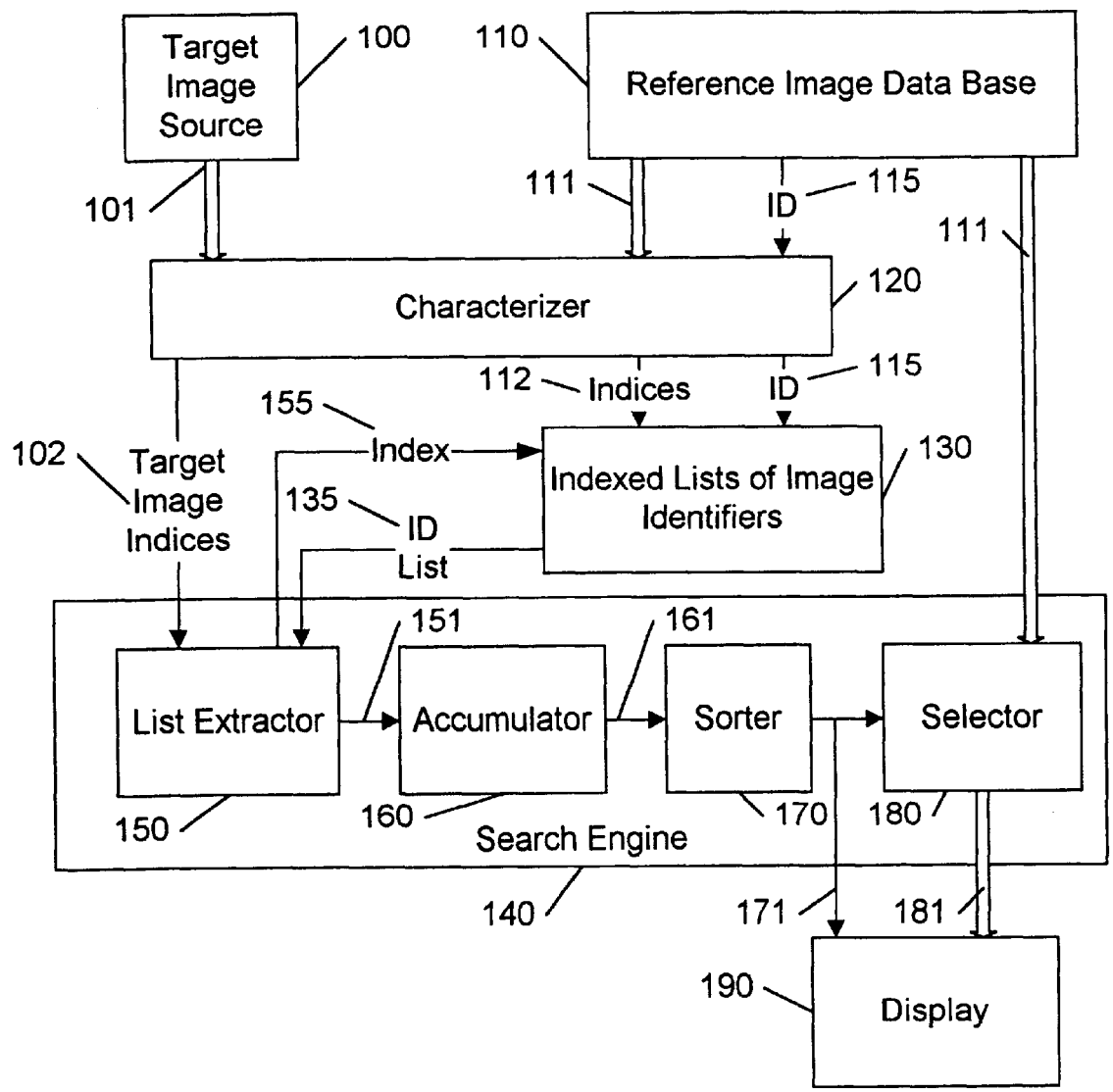
FIG. 1 illustrates an example block diagram of an image retrieval system in accordance with this invention.

FIG. 1 illustrates an example block diagram of an image retrieval system in accordance with this invention. The image retrieval system includes a characterizer 120 that produces indexes 102, 112 to lists of image identifiers 130, and a search engine 140 that processes selected lists of image identifiers 135 to determine the images 181 that have a high number of occurrences 161 in the selected lists 135.

A user provides a graphic representation of a target image 101 to the image retrieval system of FIG. 1 to determine the images 111 of a reference database 110 that are similar in characteristics to the target image 101. The source 100 of the target image 101 may be an image scanner, a digitizer, a camera, and the like. It may also be a conventional mouse or keyboard that is used to select or create target images. For example, a mouse can be utilized to create a sketch of an image using commonly available computer drawing packages. The user can modify the input images as well, to refine or modify the target image, using techniques common in the art of computer graphics.

Figure 2:
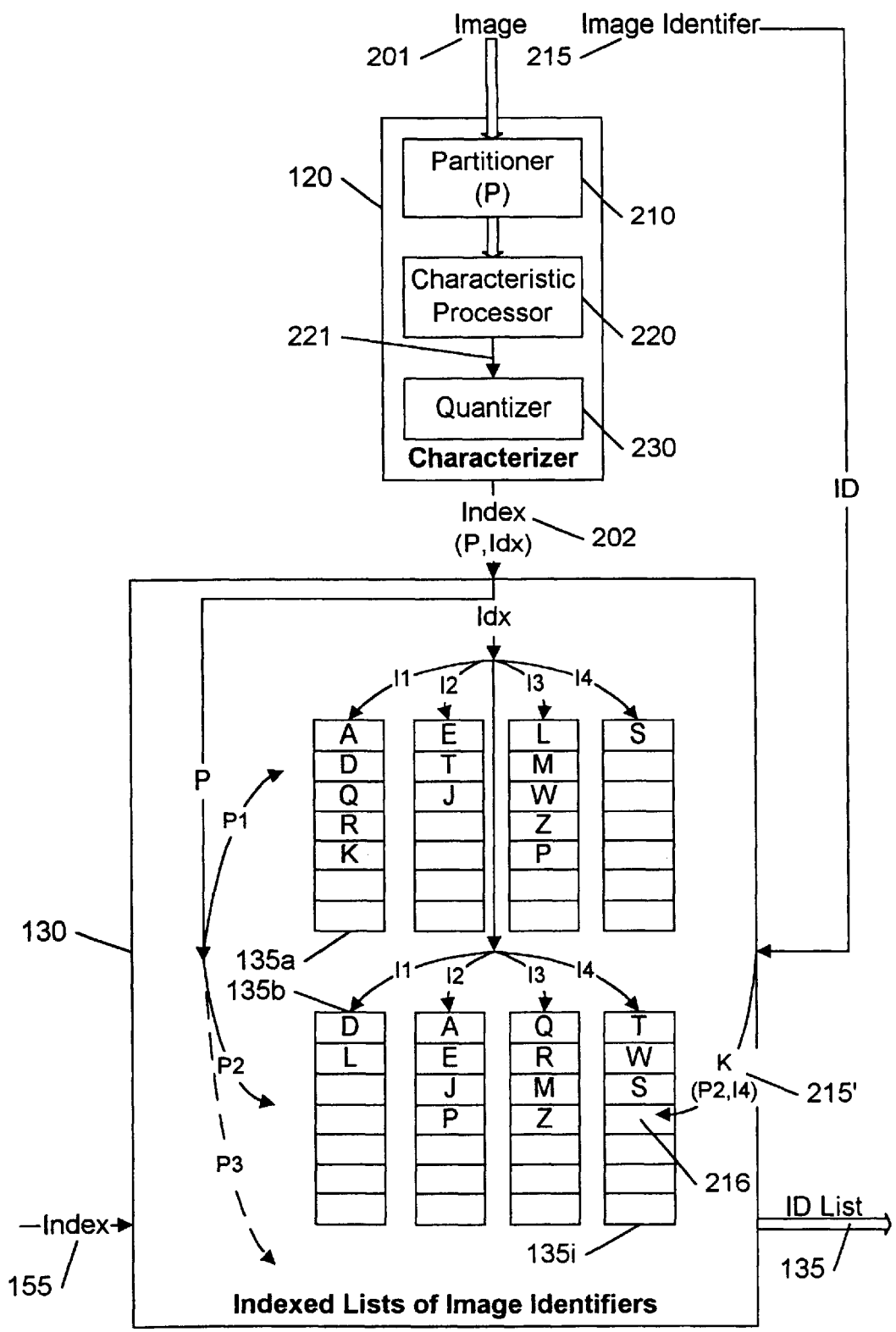
FIG. 2 illustrates an example block diagram of a characterizer that provides an index to indexed lists of image identifiers in accordance with this invention.
Figure 5:
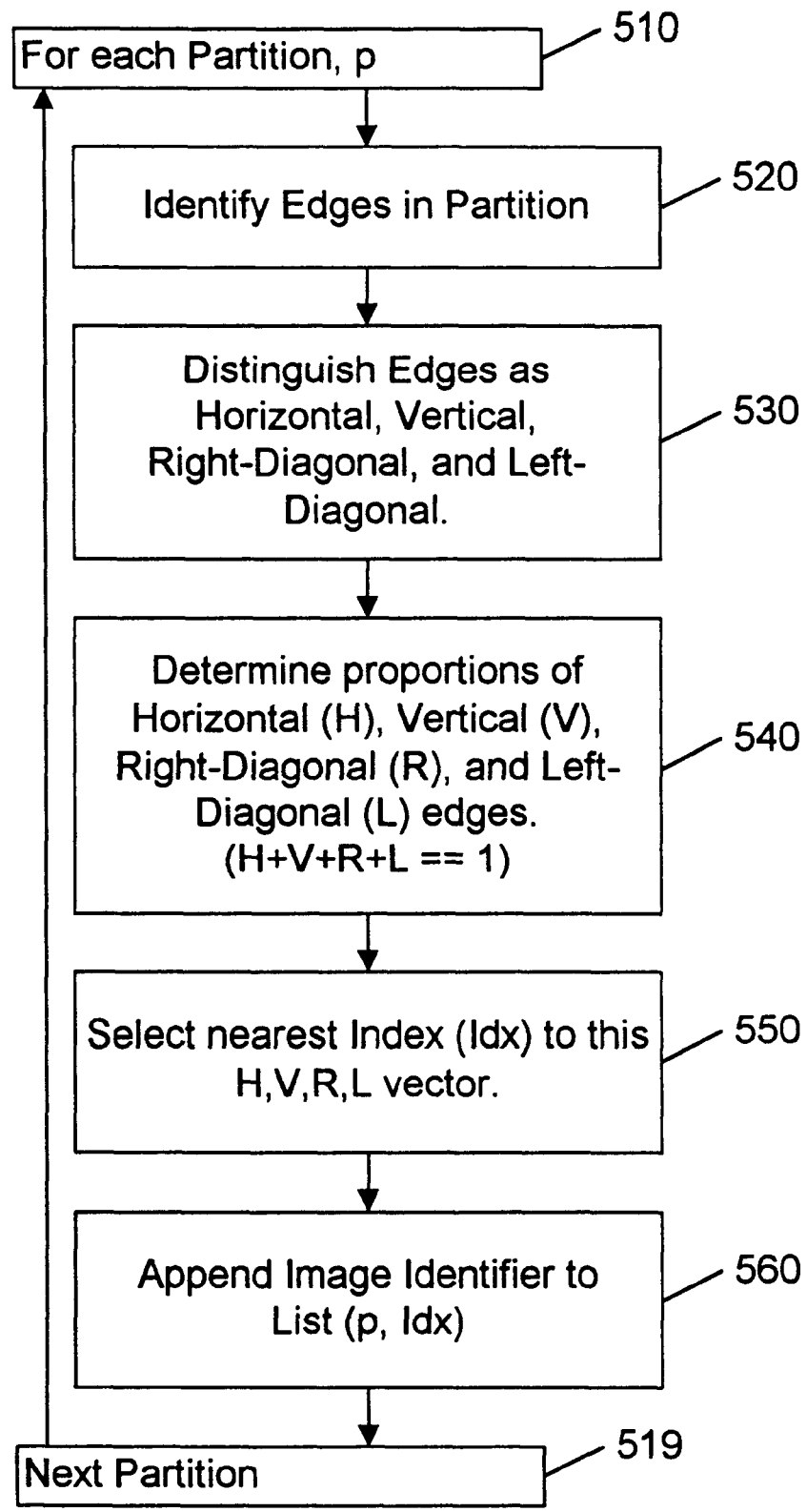
FIG. 5 illustrates an example flow chart for determining an index based upon an edge characterization in accordance with this invention.

The reference database of images 110 may be located in a local or remote disk storage, a memory device, and the like. The images are created and stored using input devices such as scanners, digitizers, and cameras, as discussed above. Additionally, they could be a series of related images as might be found in an MPEG encoded video, or a conventional video cassette tape. The term database is used herein to mean a collection of items (images), each of which can be uniquely identified. For example, an image on a remote disk may be addressed by the disk's designation followed by a file name; an image on a cassette tape may be addressed by the cassette's title, followed by an identification of where on the tape the image, or frame, is located. As is known in the art, a database may be distributed, and need not reside in a single physical device, nor need the addressing scheme be common among all devices. That is, as used herein, the reference image database 110 is independent of the physical media that contains the images, and independent of the media dependent techniques for accessing each image. Each image 111 in the reference image database 110 is provided to the characterizer 120 to create the indexed lists of image identifiers 130. FIG. 2 illustrates an example block diagram of a characterizer 120 that provides an index 202 to the indexed lists of image identifiers 130 in accordance with this invention. The characterizer 120 includes a partitioner 210, a characteristic processor 220, and a quantizer 230. The partitioner 210 partitions an image 201 into an array of partitions; typically the array is a 4×4, 8×8, or 16×16 partitioning of the image. The index 202 includes an identification P of each partition, and an indexed characterization Idx that characterizes the partition as one of a set of predefined indexed characterizations. The characteristic processor 220 processes each partition P based on the characteristic used to describe an image and produces a characteristic measure 221 that describes the partition. In general, the characteristic measure 221 is a histogram of the occurrences of the components of the descriptive characteristic, for example, the number of occurrences of particular colors, or the number of occurrences of particular types of edges (discussed hereinafter with reference to FIG. 5). Other techniques are known in the art for deriving a characteristic measure or set of measures that describe an image, such as combinations of particular shapes, average luminance and chrominance, etc. The quantizer 230 transforms the characteristic measure 221 that is produced by the characteristic processor 220 into one of a plurality of predefined indexed characterizations Idx. In the most straightforward example, the quantizer 230 transforms a histogram of occurrences of the components of the descriptive characteristic into a set of proportions of each component contained in each partition, and then quantizes each proportion into predefined 'bins' such as quartiles, octiles, etc. In the general case, each of the predefined indexed characterizations Idx is associated with a location in the parameter space of the characteristic measure 221, and a region about this location. The quantizer 230 determines the predefined indexed characteriztion Idx based on the region in which the characteristic measure 221 lies. The quantization provided by the quantizer 230 need not be uniform. For example, more indexed characterizations may be located in the area of the parameter space that corresponds to frequently occurring values of the characteristic measure, thereby providing for a greater degree of distinction among such values as compared to a uniform distribution of the indexed characterizations about the parameter space. The locations of the indexed characterizations are typically called the quantization levels, or quantization centers; for example, in a color characterization, the colors at the location of the indexed characterizations are termed the color centers. The quantization need not be uni-valued. For example, multiple indexed characterizations may be provided for each characteristic measure 221, as will be discussed below.

Each index 202 provided by the characterizer 120 is used to store an identifier 215 corresponding to the image 201. Typically, the identifier 215 is a unique numerical value for each image 201, and this numerical value corresponds to a list of locations (not shown) that identify where the image 201 is located. For example, the location specified in the list corresponding to the identifier 215 may be a conventional computer path name that identifies a file that contains the image 201. Alternatively, the location could be text that identifies a particular VCR tape in a user's library, followed by the frame number or time at which the image 201 appears. In FIG. 2, uppercase letters are used to represent the particular image identifiers 215.

The identifier 215 of the image 201 is stored in each list 135 that is associated with a partition P of the image that has an indexed characterization Idx. That is, for example, if partition P1 corresponds to the upper left corner of the images, and index I1 corresponds to an occurrence of predominantly red and blue colors, then the list 135a will be a list of the identifiers (A, D, Q, R, K) of all the images 111 in the database 110 that have predominantly red and blue colors in their upper left corner. List 135b corresponds to the images 111 in the database 110 that have predominantly red and blue colors in the area of partition P2, which may be, for example, the lower left corner of the images.

Note that image identifier D occurs in both list 135a and 135b; thus, the image 111 corresponding to identifier D must have predominantly red and blue colors in both its upper and lower left corners. Shown in FIG. 2 is an example of the storage of an identifier 215' that is characterized by the characterizer 120 as having an index 14 at partition P. The image identifier, K, is appended to the list 135i by placing it at the next available location 216 of the list 135i. That is, image identifier K is appended to a list of other identifiers (T, W, S) that have the same indexed characteristic 14 in the same partition P2. Characterization 14 may correspond to, for example, an occurrence of predominantly blue-green color; and thus each of images T, W, S, and K have been determined by characterizer 120 to have predominantly blue-green color in partition P2.

Multiple indexed characterizations may be provided for each partition. For example, characterization 14 could correspond to the occurrence of predominantly horizontal edges, or to a partition having an average brightness of 25 lumens, etc. In this manner, multiple characterizations of each partition (color, edges, luminance, etc.) of an image 201 can be used to place the image identifier 215 into multiple lists 135. The retrieval of images can thereby include retrievals based on the similarity of images 111 to one or more particular characteristics of the target image 101. The multiple characterizations may be of differing characteristics, such as color and shape, or of the same characterization, for example, a characterization of occurrences or intensities of each primary color. By providing multiple indexes of the same characterization allows, for example, a search for images having red colors in their upper right partitions, independent of the other colors that may also be present in the upper right partitions. Multiple indexes of different characterizations allow, for example, a search for images having horizontal edges and green color in the upper right partitions.

Figure 3:
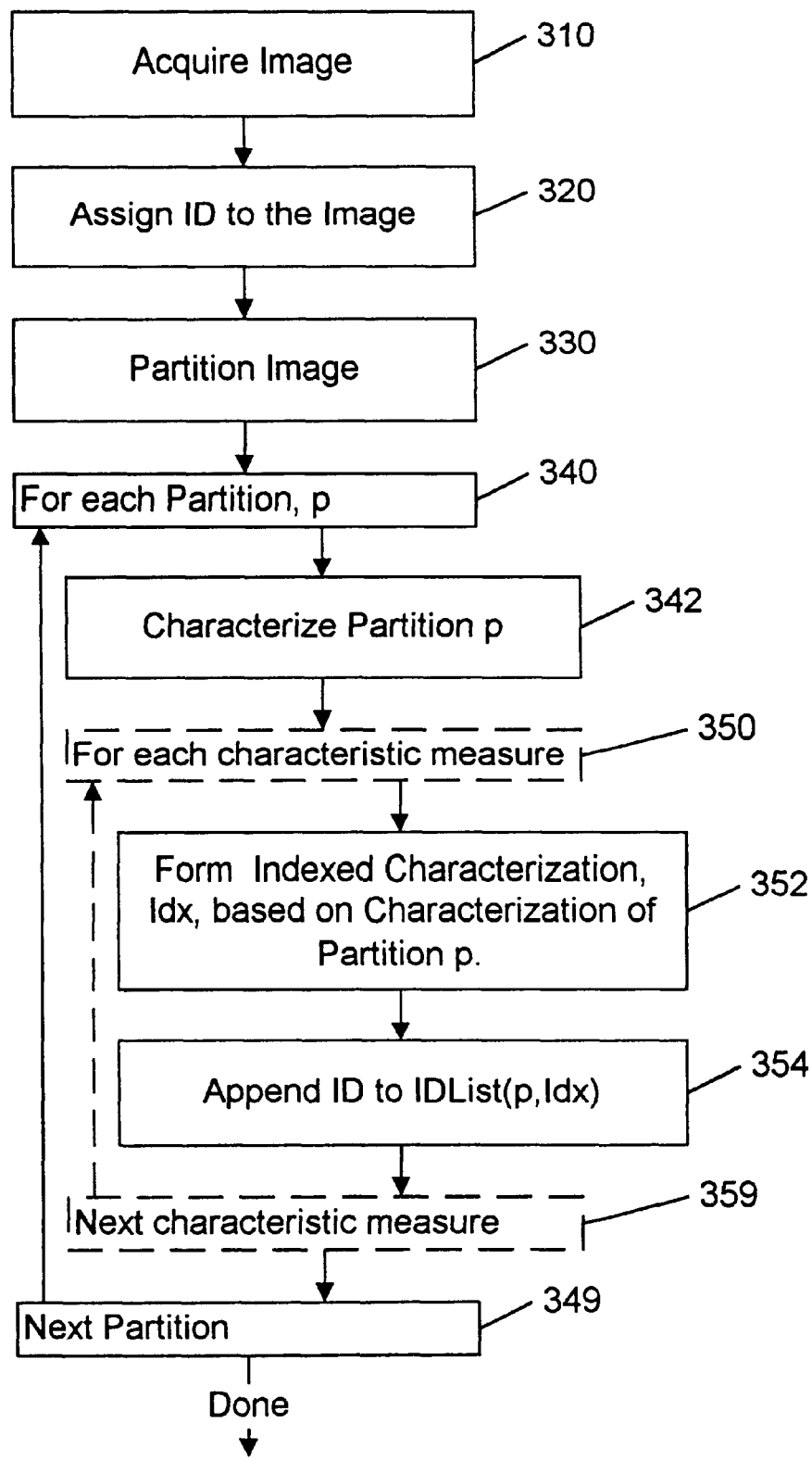
FIG. 3 illustrates an example flow chart for characterizing an image for entry in indexed lists of image identifiers in accordance with this invention.

FIG. 3 illustrates an example flow chart for characterizing an image for entry in indexed lists of image identifiers in accordance with this invention. The image is acquired, in 310, and an image identifier ID is assigned, at 320. The image is partitioned, at 330, and each partition is processed in the loop 340–349. The partition is characterized at 342 to form one or more characteristic measures. Each characteristic measure, such as color or shape, is processed in the loop 350–359. At 352, the indexed characterization corresponding to the determined value of the characteristic measure at the partition is determined. The image identifier corresponding to the image is appended to the list of image identifiers having the same indexed characterization at the same partition, at 354. Each characteristic measure for each partition of the image is similarly processed, as indicated by the "next" blocks 359, 349. Note that the flowchart of FIG.3 may be applied independently for each image that is being characterized for entry into the indexed lists of image identifiers 130. The only dependency is the availability of space in the indexed lists to append the image identifier ID. Techniques common in the art, such as dynamic linked lists, are used in the preferred embodiment to maximize the likelihood of the space being available to append the entry.

Figure 4:
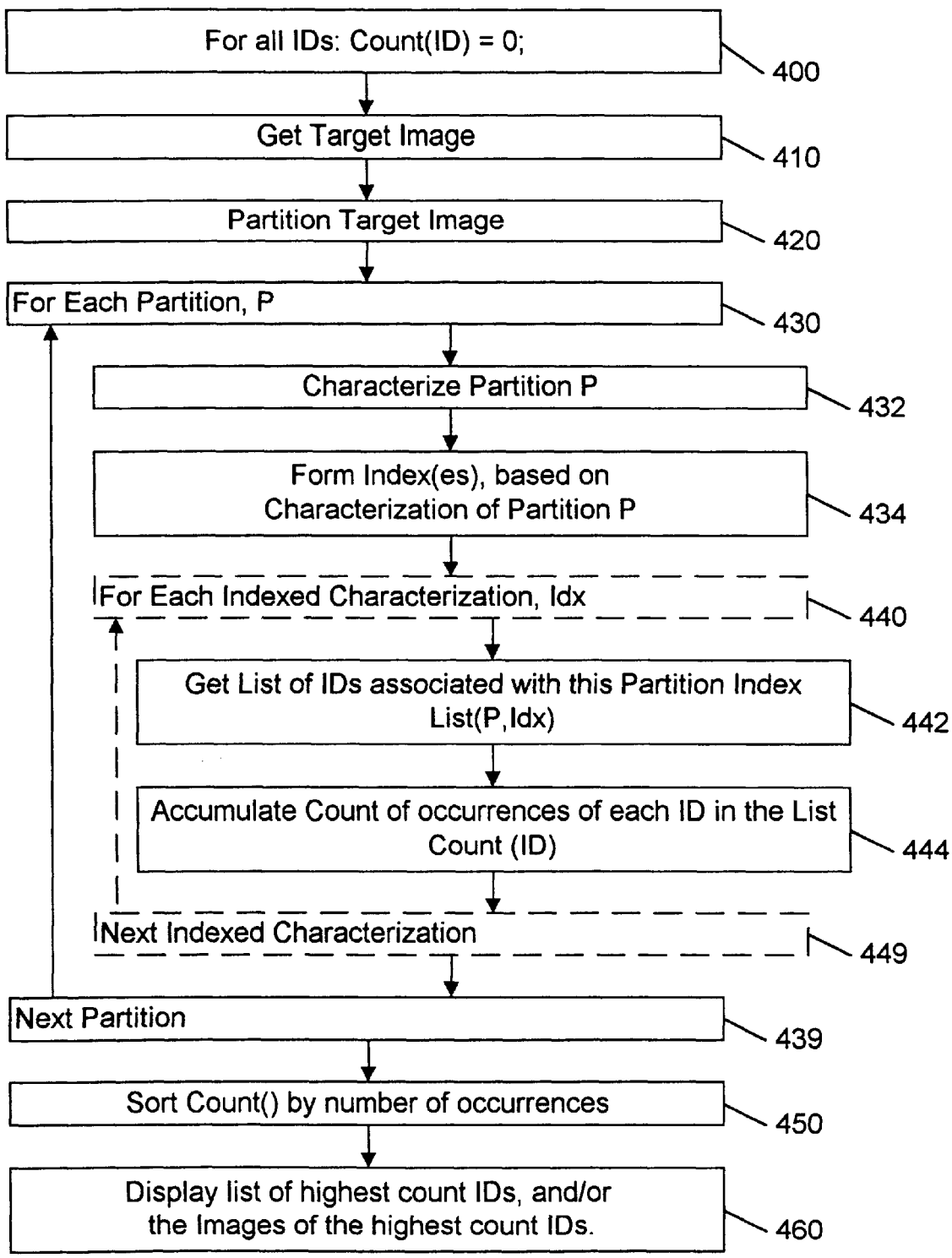
FIG. 4 illustrates an example flow chart for retrieving images that are similar to a target image in accordance with this invention.

FIG. 4 illustrates an example flow chart for retrieving characterized reference images 111 that are similar to a target image 101 in accordance with this invention. The similarity is determined by counting the number of occurrences of each reference image 111 that has a corresponding partition with the same characteristics as the target image 101. At 400, the count of the number of occurrences of each image identifier ID is initialize to zero. The target image 101 is obtained and partitioned, at 410–420. Each partition of the target image is processed in the loop 430–439. The partition p is characterized at 432, using the same characterization measures as had been used to characterize the reference images 111, or a subset of these characterization measures. That is, for example, if the reference images 111 have been characterized by color and edge characteristics, the target image 101 may be characterized at 432 for color characteristics only, or edge characteristics only, or both color and edge characteristics. In this manner, for example, black and white target images or sketches can be compared to color reference images for image composition, while color target photos or drawings can be compared for both composition and color. At 434, an indexed characterization Idx is determined for each characteristic measure, using the same quantization scheme used for determining the indexed characterizations of the reference images.

In a preferred embodiment, multiple indexed characterizations Idx may be determined for each characteristic measure, to overcome quantization anomalies. Quantization anomalies occur, for example, when two images have similar characteristic measure, but receive differing indexed characterizations because the characteristic measures lie near the boundary between two indexed characterizations and the measure of each of the images lie on opposite sides of the boundary. At 434, multiple indexed characterizations are produced whenever the characteristic measure lies within a specified range of the boundary between indexed characterizations. Other algorithms for generating multiple indexed characterizations from a target characteristic measure, for example, associating overlapping quantization regions to each indexed characterization, may also be used.

Each indexed characterization Idx is processed in the loop 440–449. For each indexed characterization Idx of each partition P, the list of image identifiers associated with this partition index (P, Idx) is extracted from the indexed lists of image identifiers, at 442. As noted above, the list of image identifiers at each index is a list of all the images in the database 110 that have the same indexed characterization of the partition. At 444, the count of each image identifier ID that is contained in the extracted list corresponding to (P, Idx) is accumulated. If multiple indexed characterizations are associated with each partition P, this accumulation of counts is dependent upon whether the multiple characterizations are dependent or independent. For example, if the characterizations are independent, such as color and edge characteristics, an image identifier ID occuuring in each of two lists (P, color-Idx) and (P, edge-Idx) accumulates two counts, thereby accumulating a higher count than an image identifier that only occurs in one of these lists. If the characterizations are dependent, however, such as redundant quantizations used to avoid quantization anomolies, as discussed above, an image identifier ID that occurs in multiple dependent-index lists accumulates a single count. The occurrence of an image identifier ID two dependent-index lists accumulates the same count regardless of whether it occurs in either or both of these dependent-index lists. In effect, the set of image identifiers associated with each partition is the union of the sets of image identifiers in each of the dependent-index lists associated with the partition. After all partitions are processed via the loop 430–439, the count variable that is associated with each image identifier contains the number of times each image identifier occurred in the lists that correspond to the indexed characterization of the partitions of the target image. That is, the count is correlated to the number of similar characteristics between the reference and target images.

At 450, the counts of the image identifiers are sorted, and the location of those having the highest count, i.e. those having the highest similarity to the target image, are presented to the user, at 460. In a preferred embodiment, the images corresponding to the image identifiers are presented to the user as well. Thus, as can be seen, the invention provides for a determination of those images in a database 110 that have the most similar characteristics to the target image 101, without requiring a direct comparison of the characteristics of the target image to each reference image.

As is evident to one of ordinary skill in the art, the techniques presented are not limited to a particular characterization scheme. For completeness, a particular characterization scheme is presented in FIG. 5 for characterizing and quantizing an image based upon an edge characterization. At 520, the edges within the partition are determined by applying any of the known techniques for detecting edges. At 530, each edge is characterized as being vertical, horizontal, left-diagonal, or right-diagonal. In a preferred embodiment, to minimize noise effects, only those edge points that form three successive points in the same direction are utilized; different levels of filtering may be obtained by requiring more or fewer successive points. Thus, each point, or picture element (pixel), in the image is identified as being on an edge or not, and if on an edge, which of four directions the edge is oriented. At 540, the edge determination of each pixel is used to determine the proportion of each type of edge contained in the image. In a preferred embodiment, the proportions of each type of edge are normalized relative to the total number of edge pixels within the partition, such that the sum of the proportions is equal to one. Alternatively, the proportions could reflect the proportion of the total number of pixels in the partition that have each type of edge, such that the sum of the proportions will be less than one and will reflect the relative complexity of the image at that partition. At 550, the histogram of edge proportions is quantized into an indexed characterization Idx, by finding the indexed characterization that is associated with this sum of proportions. In a preferred embodiment, the parameter space of the histogram of edge proportions is the surface at which the sum of the proportions is equal to one. If the sum of the proportions can be less than one, the parameter space is the volume within which the sum of the proportions is less than or equal to one. A predetermined number of characterization indexes are allocated to the parameter space. The number chosen is relatively arbitrary. The number should be high enough to distinguish among generally similar images, but not so high as to produce a distinction between very similar images. In a preferred embodiment of FIG. 5, 16 indexes are used to distinguish among the histograms of edge characterizations. These 16 characterization indexes Idx are uniformly distributed about the parameter space. At 550, the characterization index Idx that is closes to the histogram of edge proportions is determined, based on the Euclidean distance between the location associated with the index and the location corresponding to the histogram of the edge proportions. Consider, for example, two characterization indexes, Idx1 and Idx2 having associated location of (0.2, 0.3, 0.1, 0.4) and (0.25, 0.25, 0, 0.5) respectively. Consider also a histogram of the edge proportions in a partition determined to be equal to (0.23, 0.28, 0.04, 0.45), corresponding to a partition with 23% horizontal edges, 28% vertical edges, 4% right-diagonal edges, and 45% left-diagonal edges. The distance from this histogram to the location (0.2, 0.3, 0.1, 0.4) corresponding to Idx1 is the square root of $(0.23-0.2)^2+(0.28-0.3)^2+(0.04-0.1)^2+(0.45-0.4)^2$, which is approximately equal to 0.086. Similarly, the distance from the histogram to the location (0.25, 0.25, 0 0.5) corresponding to Idx2 is the square root of $(0.23-0.25)^2+(0.28-0.25)^2+(0.04-0)2+(0.45-0.5)^2$, which is approximately equal to 0.073. Therefore, Idx2 is selected as the characterization index, because it's associated location is closer to the histogram than Idx1. Other methods of determining or selecting corresponding quantization levels, for example by using predetermined bounds and table look-ups, may be used to eliminate the need to determine distances, as would be evident to one of ordinary skill in the art.

At 560, the image identifier associated with the image is appended to the list of image identifiers that is associated with the characterization index Idx of the partition p. Each partition p is similarly characterized, via the loop 510–519. As discussed above, multiple indexes can be determined for each partition. For example, to provide the advantages of a high number of characterization indexes and a low number of characterization indexes, two sets of characterization indexes may be utilized for characterizing the same partition. Similarly, to avoid the aforementioned quantization anomalies, two sets of characterization indexes, each having different boundary areas, may be used to provide two of characterization indexes for each partition. For example, the aforementioned 16 characterization indexes could comprise two sets of 8 uniformly distributed indexes, one set being located offset from the other. In this manner, the characterization measure from at least one of the two sets will not lie at a boundary area.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of image retrieval, comprising the steps of:
    partitioning a target image into a plurality of content-independent partitions,
    characterizing each partition of the plurality of content-independent partitions to form an index value associated with each partition,
    obtaining a list of image identifiers associated with the index value,
    accumulating counts of each image identifier in the list of image identifiers associated with each partition of the plurality of content-independent partitions, and
    retrieving at least one image associated with at least one of the image identifiers, based upon the counts of the at least one of the image identifiers.

2. The method of claim 1, wherein the step of characterizing each partition includes the step of characterizing at least one of:
    edges of the target image within each partition, and colors of the target image within each partition.

3. The method of claim 1, wherein the step of characterizing each partition includes the step of quantizing a characteristic of the target image within each partition to form the index value from a predetermined set of index values.

4. The method of claim 1, further including the step of providing a sorted list of image identifiers based on the counts of the image identifiers.

5. A method of indexing an image, comprising the steps of:
    identifying the image by an image identifier,
    partitioning the image into a plurality of content independent partitions,
    characterizing each content independent partition of the plurality of partitions to form at least one index value of a plurality of index values, and
    appending the image identifier to at least one list of a plurality of lists of image identifiers associated with each partition, the at least one list being determined by the at least one index value that characterizes the each partition.

6. The method of claim 5, wherein the image identifier corresponds to a location of the image in a database of images.

7. The method of claim 5, wherein the step of characterizing each partition includes the step of characterizing at least one of:
    edges of the image within each partition, and
    colors of the image within each partition.

8. The method of claim 5, wherein the step of characterizing each partition includes the step of quantizing a characteristic of the image within each partition to form the at least one index value from a predetermined set of index values.

9. The method of claim 8, wherein the step of quantizing the characteristic includes the steps of
    quantizing the characteristic to a first quantization value of a first set of quantization values, and,
    quantizing the characteristic to a second quantization value of a second set of quantization values.

10. An image retrieval system comprising:
    a partitioner that partitions a target image into a plurality of content independent partitions,
    a characterizer that characterizes the plurality of content independent partitions into a plurality of target image indexes, and a search engine, operably coupled to the characterizer, that identifies at least one reference image of a plurality of reference images that is similar to the target image based on a count of occurrences of an identifier of the at least one reference image in a plurality of lists corresponding to the plurality of target image indexes.

11. The image retrieval system of claim 10, wherein the search engine includes:

a list extractor that extracts each list of the plurality of lists from indexed lists of image identifiers based on each target index of the plurality of target indexes, an accumulator, operably coupled to the list extractor, that accumulates a plurality of counts, each count of the plurality of counts corresponding to occurrences of each identifier of a plurality of reference image identifiers in the each list that is extracted by the list extractor, and, a sorter, operably coupled to the accumulator, that identifies the at least one reference image that corresponds to an at least one identifier having a highest count of the plurality of counts.

12. The image retrieval system of claim 10, wherein the search engine further includes a selector that selects the at least one reference image from the plurality of reference images for rendering on a display based on the at least one identifier having the highest count.

13. The image retrieval system of claim 10, wherein the characterizer also characterizes the plurality of reference images to produce indexed lists of image identifiers, from which the plurality of lists corresponding to the plurality of target image indexes is derived.

14. The image retrieval system of claim 10, wherein the characterizer includes:

a characteristic processor, operably coupled to the partitioner, that processes each content independent partition of the plurality of partitions based on a descriptive characteristic of the each partition to produce characteristic measures of a plurality of characteristic measures corresponding to the plurality of partitions, and, a quantizer, operably coupled to the characteristic processor, that produces the plurality of target image indexes based on the plurality of characteristic measures corresponding to the plurality of partitions.

15. The image retrieval system of claim 14, wherein the descriptive characteristic of the each partition is a count of occurrences of edges that are contained in the partition.

16. The image retrieval system of claim 15, wherein the edges that are contained in the partition are distinguished as horizontal edges, vertical edges, right-diagonal edges, and left-diagonal edges, and the count of occurrences of edges is a histogram of occurrences of the horizontal edges, the vertical edges, the right-diagonal edges, and the left-diagonal edges.

17. The image retrieval system of claim 14, wherein the descriptive characteristic of the each partition is a count of occurrences of colors that are contained in the partition.

18. The image retrieval system of claim 17, wherein the colors are distinguished as a plurality of color centers, and the count of occurrences of colors is a histogram of occurrences of an each quantized color of the plurality of color centers.

19. The image retrieval system of claim 14, wherein the characteristic measures is a histogram of occurrences of elements of the descriptive characteristic, and wherein the quantizer normalizes the histogram of occurrences to produce a normalized histogram and selects each index of the plurality of target image indexes based on the normalized histogram corresponding to the each partition of the plurality of partitions.

20. The image retrieval system of claim 14, wherein the quantizer produces more than one of the plurality of target image indexes based on a plurality of sets of overlapping quantization levels.

* * * * *